United States Patent [19]

Femal et al.

[11] Patent Number: 5,299,300
[45] Date of Patent: Mar. 29, 1994

[54] INTERPOLATION PROCESSING OF DIGITAL MAP IMAGERY DATA

[75] Inventors: Michael J. Femal; Kenrick W. Kautz, both of Palm Bay, Fla.

[73] Assignee: Harris Corporation, Melbourne, Fla.

[21] Appl. No.: 74,103

[22] Filed: Jun. 8, 1993

Related U.S. Application Data

[63] Continuation of Ser. No. 484,098, Feb. 22, 1990, abandoned.

[51] Int. Cl.⁵ .............................................. G06F 15/62
[52] U.S. Cl. ...................................... 395/128; 395/164; 364/449; 340/995; 345/136
[58] Field of Search ............... 395/128, 164, 131, 130, 395/135; 340/728, 703, 990, 995; 364/449, 443; 434/150, 151, 152

[56] References Cited

U.S. PATENT DOCUMENTS

| | | | |
|---|---|---|---|
| 4,428,057 | 1/1984 | Setliff et al. | 364/449 X |
| 4,615,013 | 9/1986 | Yan et al. | 395/128 X |
| 4,638,438 | 1/1987 | Endo et al. | 364/449 |
| 4,821,212 | 4/1989 | Heartz | 395/130 X |
| 4,876,651 | 10/1989 | Dawson et al. | 364/449 |
| 4,884,971 | 12/1989 | Chan et al. | 340/995 X |
| 4,970,682 | 11/1990 | Beckwith, Jr. et al. | 395/425 |

*Primary Examiner*—Raymond J. Bayerl
*Attorney, Agent, or Firm*—Charles E. Wands

[57] ABSTRACT

Interpolation processing of digital map imagery data is carried out by prefetching full and half resolution data stored in half-resolution addresses of scene memory into a cache and accessing the cache as virtual addresses associated with the interlaced scan of the display are generated. Both full and half-resolution data is controllably weighted and summed bi-linearly to obtain interpolated data values for spatial locations corresponding to the virtual addresses. For a respective half-resolution storage location, stored imagery data includes both half-resolution data, (such as that representative of color characteristics, elevation, cultural features, linear and area features) of its associated half-resolution spatial location in a terrain map and a plurality of full-resolution data for a plurality of full-resolution spatial locations of the terrain map that are located in a adjacent neighborhood surrounding the half-resolution spatial location.

30 Claims, 17 Drawing Sheets

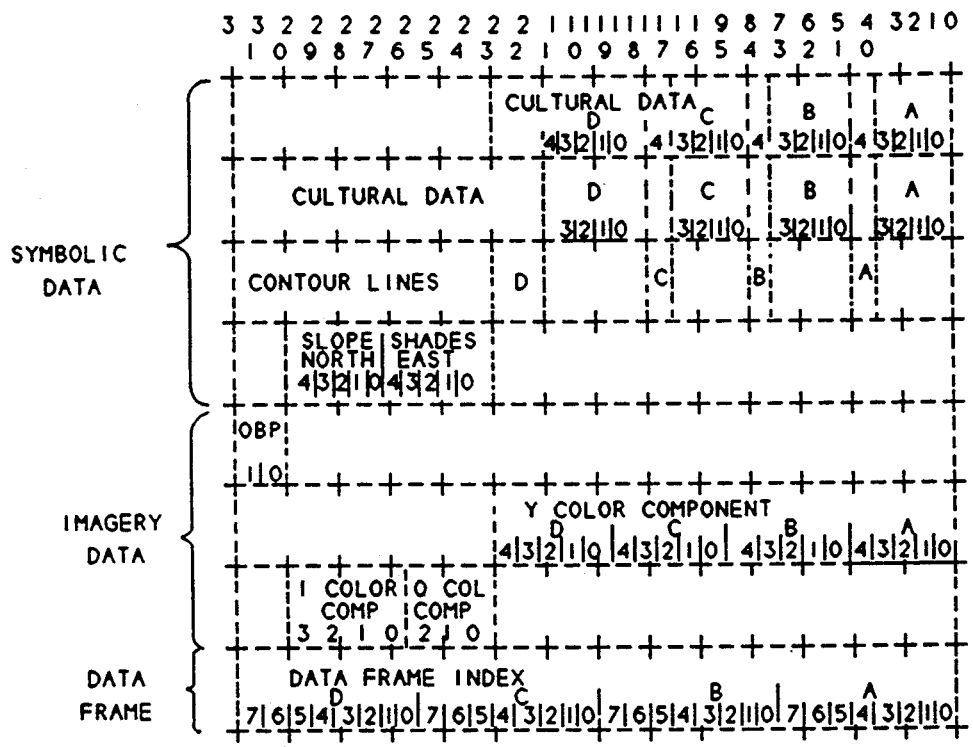
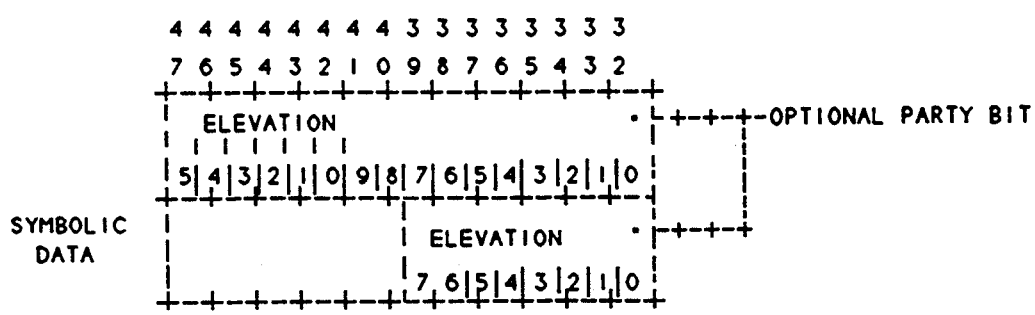
FIG. 3

Scene Memory Logical Addresses

| 0,1023 | | | | | 70 | 1023,1023 |
|---|---|---|---|---|---|---|---|
| logical block 38H | logical block 39H | logical block 3AH | logical block 3BH | logical block 3CH | logical block 3DH | logical block 3EH | logical block 3FH |
| logical block 30H | logical block 31H | logical block 32H | logical block 33H | logical block 34H | logical block 35H | logical block 36H | logical block 37H |
| logical block 28H | logical block 29H | logical block 2AH | logical block 2BH | logical block 2CH | logical block 2DH | logical block 2EH | logical block 2FH |
| logical block 20H | logical block 21H | logical block 22H | logical block 23H | logical block 24H | logical block 25H | logical block 26H | logical block 27H |
| logical block 18H | logical block 19H | logical block 1AH | logical block 1BH | logical block 1CH | logical block 1DH | logical block 1EH | logical block |
| logical block 10H | logical block 11H | logical block 12H | logical block 13H | logical block 14H | logical block 15H | logical block 16H | logical block 17H |
| logical block 8H | logical block 9H | logical block 0AH | logical block 0BH | logical block 0CH | logical block 0DH | logical block 0EH | logical block 0FH |
| logical block 0H | logical block 1H | logical block 2H | logical block 3H | logical block 4H | logical block 5H | logical block 6H | logical block 7H |

SCENE MEMORY BLOCK

| 127 | O | E | O | E | O |   | E | O | E | O | E |
|---|---|---|---|---|---|---|---|---|---|---|---|
| 126 | E | O | E | O | E |   | O | E | O | E | O |
| 125 | O | E | O | E | O |   | E | O | E | O | E |
| 124 | E | O | E | O | E |   | O | E | O | E | O |
| 123 | O | E | O | E | O |   | E | O | E | O | E |

| 4 | E | O | E | O | E |   | O | E | O | E | O |
|---|---|---|---|---|---|---|---|---|---|---|---|
| 3 | O | E | O | E | O |   | E | O | E | O | E |
| 2 | E | O | E | O | E |   | O | E | O | E | O |
| 1 | O | E | O | E | O |   | E | O | E | O | E |
| 0 | E | O | E | O | E |   | O | E | O | E | O |

FULL RESOLUTION DATA

FIG. 8

HR NN COEFF
(UPPER LEFT)

| Y\X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F | F | F | E | D | C | B | A | 9 | 8 | 7 | 6 | 5 | 4 | 3 | 2 | 1 |
| E | E | E | D | C | B | A | 9 | 8 | 7 | 7 | 6 | 5 | 4 | 3 | 2 | 1 |
| D | D | D | C | B | A | 9 | 9 | 8 | 7 | 6 | 5 | 5 | 4 | 3 | 2 | 1 |
| C | C | C | B | A | 9 | 9 | 8 | 7 | 6 | 6 | 5 | 4 | 3 | 3 | 2 | 1 |
| B | B | B | A | 9 | 9 | 8 | 7 | 7 | 6 | 5 | 5 | 4 | 3 | 3 | 2 | 1 |
| A | A | A | 9 | 9 | 8 | 7 | 7 | 6 | 5 | 5 | 4 | 4 | 3 | 2 | 2 | 1 |
| 9 | 9 | 9 | 8 | 8 | 7 | 7 | 6 | 6 | 5 | 4 | 4 | 3 | 3 | 2 | 2 | 1 |
| 8 | 8 | 8 | 7 | 7 | 6 | 6 | 5 | 5 | 4 | 4 | 3 | 3 | 2 | 2 | 1 | 1 |
| 7 | 7 | 7 | 7 | 6 | 6 | 5 | 5 | 4 | 4 | 4 | 3 | 3 | 2 | 2 | 1 | 1 |
| 6 | 6 | 6 | 6 | 5 | 5 | 5 | 4 | 4 | 3 | 3 | 3 | 2 | 2 | 2 | 1 | 1 |
| 5 | 5 | 5 | 5 | 5 | 4 | 4 | 4 | 3 | 3 | 3 | 2 | 2 | 2 | 1 | 1 | 1 |
| 4 | 4 | 4 | 4 | 4 | 3 | 3 | 3 | 3 | 2 | 2 | 2 | 2 | 1 | 1 | 1 | 1 |
| 3 | 3 | 3 | 3 | 3 | 3 | 3 | 2 | 2 | 2 | 2 | 2 | 1 | 1 | 1 | 1 | 1 |
| 2 | 2 | 2 | 2 | 2 | 2 | 2 | 2 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 |

Y FRAC ADDR ↑

X FRAC ADDR →

FIG. 10

HR XN COEFF
(UPPER RIGHT)

| Y\X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F | 0 | 0 | 1 | 2 | 3 | 4 | 5 | 6 | 7 | 8 | 9 | A | B | C | D | E |
| E | 0 | 0 | 1 | 2 | 3 | 4 | 5 | 6 | 7 | 7 | 8 | 9 | A | B | C | D |
| D | 0 | 0 | 1 | 2 | 3 | 4 | 4 | 5 | 6 | 7 | 8 | 8 | 9 | A | B | C |
| C | 0 | 0 | 1 | 2 | 3 | 3 | 4 | 5 | 6 | 6 | 7 | 8 | 9 | 9 | A | B |
| B | 0 | 0 | 1 | 2 | 2 | 3 | 4 | 4 | 5 | 6 | 6 | 7 | 8 | 8 | 9 | A |
| A | 0 | 0 | 1 | 1 | 2 | 3 | 3 | 4 | 5 | 5 | 6 | 6 | 7 | 8 | 8 | 9 |
| 9 | 0 | 0 | 1 | 1 | 2 | 2 | 3 | 3 | 4 | 5 | 5 | 6 | 6 | 7 | 7 | 8 |
| 8 | 0 | 0 | 1 | 1 | 2 | 2 | 3 | 3 | 4 | 4 | 5 | 5 | 6 | 6 | 7 | 7 |
| 7 | 0 | 0 | 0 | 1 | 1 | 2 | 2 | 3 | 3 | 3 | 4 | 4 | 5 | 5 | 6 | 6 |
| 6 | 0 | 0 | 0 | 1 | 1 | 1 | 2 | 2 | 3 | 3 | 3 | 4 | 4 | 4 | 5 | 5 |
| 5 | 0 | 0 | 0 | 0 | 1 | 1 | 1 | 2 | 2 | 2 | 3 | 3 | 3 | 4 | 4 | 4 |
| 4 | 0 | 0 | 0 | 0 | 1 | 1 | 1 | 1 | 2 | 2 | 2 | 2 | 3 | 3 | 3 | 3 |
| 3 | 0 | 0 | 0 | 0 | 0 | 0 | 1 | 1 | 1 | 1 | 1 | 2 | 2 | 2 | 2 | 2 |
| 2 | 0 | 0 | 0 | 0 | 0 | 0 | 0 | 0 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

Y FRAC ADDR ↑

X FRAC ADDR →

FIG. 11

HR YN COEFF
(LOWER LEFT)

| Y\X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F | 1 | 0 | 0 | 0 | 0 | 0 | 0 | 0 | 0 | 0 | 0 | 0 | 0 | 0 | 0 | 0 |
| E | 2 | 1 | 1 | 1 | 1 | 1 | 1 | 1 | 0 | 0 | 0 | 0 | 0 | 0 | 0 | 0 |
| D | 3 | 2 | 2 | 2 | 2 | 2 | 1 | 1 | 1 | 1 | 0 | 0 | 0 | 0 | 0 | 0 |
| C | 4 | 3 | 3 | 3 | 3 | 2 | 2 | 2 | 2 | 1 | 1 | 1 | 1 | 0 | 0 | 0 |
| B | 5 | 4 | 4 | 4 | 3 | 3 | 3 | 2 | 2 | 2 | 1 | 1 | 1 | 0 | 0 | 0 |
| A | 6 | 5 | 5 | 4 | 4 | 4 | 3 | 3 | 3 | 2 | 2 | 1 | 1 | 1 | 0 | 0 |
| 9 | 7 | 6 | 6 | 5 | 5 | 4 | 4 | 3 | 3 | 3 | 2 | 2 | 1 | 1 | 0 | 0 |
| 8 | 8 | 7 | 7 | 6 | 6 | 5 | 5 | 4 | 4 | 3 | 3 | 2 | 2 | 1 | 1 | 0 |
| 7 | 9 | 8 | 7 | 7 | 6 | 6 | 5 | 5 | 4 | 3 | 3 | 2 | 2 | 1 | 1 | 0 |
| 6 | A | 9 | 8 | 8 | 7 | 6 | 6 | 5 | 5 | 4 | 3 | 3 | 2 | 1 | 1 | 0 |
| 5 | B | A | 9 | 8 | 8 | 7 | 6 | 6 | 5 | 4 | 4 | 3 | 2 | 2 | 1 | 0 |
| 4 | C | B | A | 9 | 9 | 8 | 7 | 6 | 6 | 5 | 4 | 3 | 3 | 2 | 1 | 0 |
| 3 | D | C | B | A | 9 | 8 | 8 | 7 | 6 | 5 | 4 | 4 | 3 | 2 | 1 | 0 |
| 2 | E | D | C | B | A | 9 | 8 | 7 | 7 | 6 | 5 | 4 | 3 | 2 | 1 | 0 |
| 1 | F | E | D | C | B | A | 9 | 8 | 7 | 6 | 5 | 4 | 3 | 2 | 1 | 0 |
| 0 | 10 | F | E | D | C | B | A | 9 | 8 | 7 | 6 | 5 | 4 | 3 | 2 | 1 |

Y FRAC ADDR ↑

X FRAC ADDR →

FIG. 12

HR FN COEFF
(LOWER RIGHT)

| Y\X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F | 0 | 1 | 1 | 1 | 1 | 1 | 1 | 1 | 1 | 1 | 1 | 1 | 1 | 1 | 1 | 1 |
| E | 0 | 1 | 1 | 1 | 1 | 1 | 1 | 1 | 2 | 2 | 2 | 2 | 2 | 2 | 2 | 2 |
| D | 0 | 1 | 1 | 1 | 1 | 1 | 2 | 2 | 2 | 2 | 2 | 3 | 3 | 3 | 3 | 3 |
| C | 0 | 1 | 1 | 1 | 1 | 2 | 2 | 2 | 2 | 3 | 3 | 3 | 3 | 4 | 4 | 4 |
| B | 0 | 1 | 1 | 1 | 2 | 2 | 2 | 3 | 3 | 3 | 4 | 4 | 4 | 5 | 5 | 5 |
| A | 0 | 1 | 1 | 2 | 2 | 2 | 3 | 3 | 3 | 4 | 4 | 5 | 5 | 5 | 6 | 6 |
| 9 | 0 | 1 | 1 | 2 | 2 | 3 | 3 | 4 | 4 | 4 | 5 | 5 | 6 | 6 | 7 | 7 |
| 8 | 0 | 1 | 1 | 2 | 2 | 3 | 3 | 4 | 4 | 5 | 5 | 6 | 6 | 7 | 7 | 8 |
| 7 | 0 | 1 | 2 | 2 | 3 | 3 | 4 | 4 | 5 | 6 | 6 | 7 | 7 | 8 | 8 | 9 |
| 6 | 0 | 1 | 2 | 2 | 3 | 4 | 4 | 5 | 5 | 6 | 7 | 7 | 8 | 9 | 9 | A |
| 5 | 0 | 1 | 2 | 3 | 3 | 4 | 5 | 5 | 6 | 7 | 7 | 8 | 9 | 9 | A | B |
| 4 | 0 | 1 | 2 | 3 | 3 | 4 | 5 | 6 | 6 | 7 | 8 | 9 | 9 | A | B | C |
| 3 | 0 | 1 | 2 | 3 | 4 | 5 | 5 | 6 | 7 | 8 | 9 | 9 | A | B | C | D |
| 2 | 0 | 1 | 2 | 3 | 4 | 5 | 6 | 7 | 7 | 8 | 9 | A | B | C | D | E |
| 1 | 0 | 1 | 2 | 3 | 4 | 5 | 6 | 7 | 8 | 9 | A | B | C | D | E | F |
| 0 | 0 | 1 | 2 | 3 | 4 | 5 | 6 | 7 | 8 | 9 | A | B | C | D | E | F |

Y FRAC ADDR ↑

X FRAC ADDR →

FIG. 13

FIG. 14 — FR XN COEFF (UPPER LEFT)

| Y↓ / X→ | C | D | E | F | 0 | 1 | 2 | 3 |
|---|---|---|---|---|---|---|---|---|
| B | 2 | 4 | 6 | 7 | 9 | B | D | E |
| A | 2 | 3 | 5 | 6 | 8 | 9 | B | C |
| 9 | 2 | 3 | 4 | 5 | 7 | 8 | 9 | A |
| 8 | 1 | 2 | 3 | 4 | 5 | 6 | 7 | 8 |
| 7 | 1 | 2 | 3 | 3 | 4 | 5 | 6 | 6 |
| 6 | 1 | 1 | 2 | 2 | 3 | 3 | 4 | 4 |
| 5 | 1 | 1 | 1 | 1 | 2 | 2 | 2 | 2 |
| 4 | 0 | 0 | 0 | 0 | 0 | 0 | 0 | 0 |

FIG. 15 — FR NN COEFF (UPPER RIGHT)

| Y↓ / X→ | C | D | E | F | 0 | 1 | 2 | 3 |
|---|---|---|---|---|---|---|---|---|
| B | C | A | 8 | 7 | 5 | 3 | 1 | 0 |
| A | A | 9 | 7 | 6 | 4 | 3 | 1 | 0 |
| 9 | 8 | 7 | 6 | 5 | 3 | 2 | 1 | 0 |
| 8 | 7 | 6 | 5 | 4 | 3 | 2 | 1 | 0 |
| 7 | 5 | 4 | 3 | 3 | 2 | 1 | 0 | 0 |
| 6 | 3 | 3 | 2 | 2 | 1 | 1 | 0 | 0 |
| 5 | 1 | 1 | 1 | 1 | 0 | 0 | 0 | 0 |
| 4 | 0 | 0 | 0 | 0 | 0 | 0 | 0 | 0 |

FIG. 17 — FR YN COEFF (LOWER RIGHT)

| Y \ X | C | D | E | F | 0 | 1 | 2 | 3 |
|---|---|---|---|---|---|---|---|---|
| B | 2 | 4 | 6 | 7 | 9 | B | D | E |
| A | 2 | 3 | 5 | 6 | 8 | 9 | B | C |
| 9 | 2 | 3 | 4 | 5 | 7 | 8 | 9 | A |
| 8 | 1 | 2 | 3 | 4 | 5 | 6 | 7 | 8 |
| 7 | 1 | 2 | 3 | 3 | 4 | 5 | 6 | 6 |
| 6 | 1 | 1 | 2 | 2 | 3 | 3 | 4 | 4 |
| 5 | 0 | 0 | 1 | 1 | 2 | 2 | 2 | 2 |
| 4 | 0 | 0 | 0 | 0 | 0 | 0 | 0 | 0 |

FIG. 16 — FR FN COEFF (LOWER LEFT)

| Y \ X | C | D | E | F | 0 | 1 | 2 | 3 |
|---|---|---|---|---|---|---|---|---|
| B | 0 | 0 | 0 | 1 | 1 | 1 | 1 | 2 |
| A | 0 | 1 | 1 | 2 | 2 | 3 | 3 | 4 |
| 9 | 0 | 1 | 2 | 3 | 3 | 4 | 5 | 6 |
| 8 | 1 | 2 | 3 | 4 | 5 | 6 | 7 | 8 |
| 7 | 1 | 2 | 3 | 5 | 6 | 7 | 8 | A |
| 6 | 1 | 3 | 4 | 6 | 7 | 9 | A | C |
| 5 | 1 | 3 | 5 | 7 | 8 | A | C | E |
| 4 | 2 | 4 | 6 | 8 | A | C | E | 10 |

INTERPOLATION PROCESSING OF DIGITAL MAP IMAGERY DATA

This is a continuation of application Ser. No. 484,098, filed Feb. 22, 1990, now abandoned.

FIELD OF THE INVENTION

The present invention relates in general to terrain map color imagery display systems and is particularly directed to a mechanism for interpolating data stored within a digital color terrain map database (scene memory), for defining the values of pixel energization signals whose corresponding spatial locations in the stored terrain map image do not necessarily coincide with corresponding spatial locations of the data within that database.

BACKGROUND OF THE INVENTION

Co-pending U.S. Pat. No. 4,970,682, issued Nov. 13, 1990, derived from parent application Ser. No. 168,437, filed Mar. 15, 1988, (the original 'continuation chain' parent application of which, Ser. No. 224,742, now abandoned was filed Jan. 13, 1981), by Paul B. Beckwith et al, entitled Digital Map Generator and Display System, assigned to the assignee of the present application and the disclosure of which is incorporated herein, describes a digital map generation and display system which is capable of accessing and displaying a digital terrain map image to an observer (e.g. the pilot of a fixed or rotary wing aircraft) effectively in real time with the travel of the aircraft over that terrain. A principal factor in the ability of the system to effect a real time display is the combination of a scene memory, which stores a portion of digital map imagery data that has been decompressed from a mass storage device in a prescribed orientation (North-up), and a controlled addressing scheme for reading out data from the scene memory for display in accordance with heading information supplied by the aircraft's on-board navigation equipment. Because the scene memory address signals (which are navigation-dependent) can be expected to be associated with spatial locations in the (terrain map) image that do not necessarily coincide with spatial locations in the map from which the data stored in memory was originally derived, it is necessary to interpolate the data which is used to drive the pixels of the display.

Previously, such interpolation has been accomplished by techniques which include choosing a stored data value associated with that image spatial location closest to the spatial location for the pixel address, or by 'truncating' the pixel address to that memory address which is associated with a prescribed one of a set of geometrically dispersed spatial locations adjacent to the spatial location of the pixel of interest. Because such approximations do not take into account variations across the terrain map, such as abrupt color changes, and are limited by the resolution of the database, they may introduce anomalies (e.g. flickering lines) in the displayed image, especially during image rotation, thereby degrading image quality.

SUMMARY OF THE INVENTION

In accordance with the present, invention, the system described in the Beckwith et al patent is substantially enhanced by means of a cache memory and improved interpolation mechanism which both increases throughput and processing speed and yields a color image having reduced artifacts between high contrast areas in the image. More particularly, the present invention is directed to a color display apparatus, such as that employed for a cockpit display in a fixed or rotary wing aircraft, the display having an array of color pixels which are controllably energized by respective pixel control signals, for displaying an image, such as a color terrain map, digital data for which read out from a data base stored in a scene memory. Address signals for accessing the scene memory may be generated in accordance with heading information signals derived from the aircraft's navigation system and, as noted previously, can be expected to be associated with spatial locations in the terrain map other than those associated with the actual stored data.

In order to reduce memory size requirements, the present invention employs a half-resolution storage compression scheme and an auxiliary scene memory cache through which full resolution data is accessed. Interpolation of pixel energization signals for any spatial location on the terrain map is performed by the controlled weighting and summing of plural half and full resolution data values that are stored in (half-resolution) memory addresses whose associated spatial locations neighbor that of the spatial location of interest.

Half-resolution storage compression is carried out by storing, in respective half-resolution representative addressable storage locations of the scene memory, imagery data associated with respective half-resolution spatial locations of a (terrain map) image. For a respective storage location, that imagery data includes first (half-resolution) imagery data (such as that representative of color characteristics, elevation, cultural features, linear and area features stored as full-resolution data) of its associated first spatial location in the terrain map and a plurality of second (full-resolution) imagery data for a plurality of second (full-resolution) spatial locations of the terrain map that are located in an adjacent neighborhood surrounding that first spatial location of the terrain map.

For each respective pixel of the display for which a pixel control signal is to be generated, data values associated with a plurality of surrounding spatial locations are pre-fetched from scene memory into the high speed cache. A virtual memory address signal, representative of that pixel's associated spatial location within the scene memory-resident terrain map database, is then used to access plural neighborhood addresses in the cache memory, the neighborhood addresses being associated with half-resolution spatial locations which are adjacent to the spatial location of the virtual memory address. The accessed imagery data is then processed to generate a pixel control signal associated with that respective pixel.

As noted earlier, in order to avoid discontinuities in the displayed image that would result from simply picking the data value of a single closest spatial location, the present invention interpolates each data value by controllably combining (bi-linear weighting and summing) both half and full resolution data stored in the accessed half-resolution addresses. In particular, for the example of generating luminance and chrominance (YIQ) values for a respective pixel within a scanned color map, since most of the image energy is associated with the luminance component, half-resolution I and Q data accessed from a neighborhood of addressed storage locations of the cache are combined to derive a first code representative of a first color characteristic (chrominance), and selected full-resolution Y data (associated with a full-resolution neighborhood of spatial locations adjacent to that of the virtual address) are combined to derive a second code representative of a second image characteristic (luminance).

For another type of image, e.g. symbology, the stored data may be representative of slope shade characteristics of the half-resolution spatial location of the image and the full-resolution data may be representative of cultural characteristics of each of the neighboring full-resolution spatial locations of the image. In this instance, a pixel data value is generated in accordance with a bi-linear interpolation of slope shade representative data associated with the storage locations associated with half-resolution spatial locations to derive a code representative of an interpolated slope shade value for the spatial location of the image associated with the virtual address, and bi-linear combining of cultural feature representative data associated with selected ones of full-resolution spatial locations adjacent to the half-resolution spatial locations to derive a second code representative of an interpolated cultural feature value for the spatial location associated with the virtual address.

In the course of executing bi-linear interpolation, weighting of half and full-resolution data values may be carried out in accordance with the contents of a plurality of matrices of weighting coefficients, each matrix being associated with a respective one of plural spatial locations neighboring the spatial location of the virtual address. Accessed imagery data is multiplied by a weighting coefficient from a respective one of the matrices so as to produce a plurality of weighted values, which are then summed to produce a respective pixel control code.

In order to warn the pilot of the situation where the height of the terrain being displayed is lower than the actual altitude of the aircraft approaching that terrain, a color overlay may be employed to selectively tint the displayed terrain map to a warning or offset color. The selective tinting is executed by an overlay bit processor, which selectively combines color-modifying (overlay bit plane) data with the interpolated YIQ codes to realize a final YIQ color. The YIQ codes are coupled to a downstream YIQ/RGB conversion circuit (YIQ-RGB look-up table) for converting the YIQ codes into corresponding RGB codes for driving the respective pixel of the display.

BRIEF DESCRIPTION OF THE DRAWINGS

FIG. 3 shows associated data fields for half and full resolution storage of scanned imagery, symbology and data frames;

FIG. 6 diagrammatically illustrates an 8×8 array of logical block addresses of a scene memory directory for addressing the physical blocks of scene memory;

FIG. 7 shows the organization of an interleaved pair set of odd and even entries of respective odd and even memory banks;

FIG. 8 diagrammatically illustrates the manner in which adjacent address locations of a half-resolution neighborhood are associated with different memory banks;

FIGS. 10–13 respectively show half-resolution coefficient look-up tables, associated with each of half-resolution addresses Q, R, S and T;

FIGS. 14–17 respectively show full-resolution coefficient look-up tables, associated with each of full-resolution addresses A, B, C and D;

DETAILED DESCRIPTION

Figure 1:
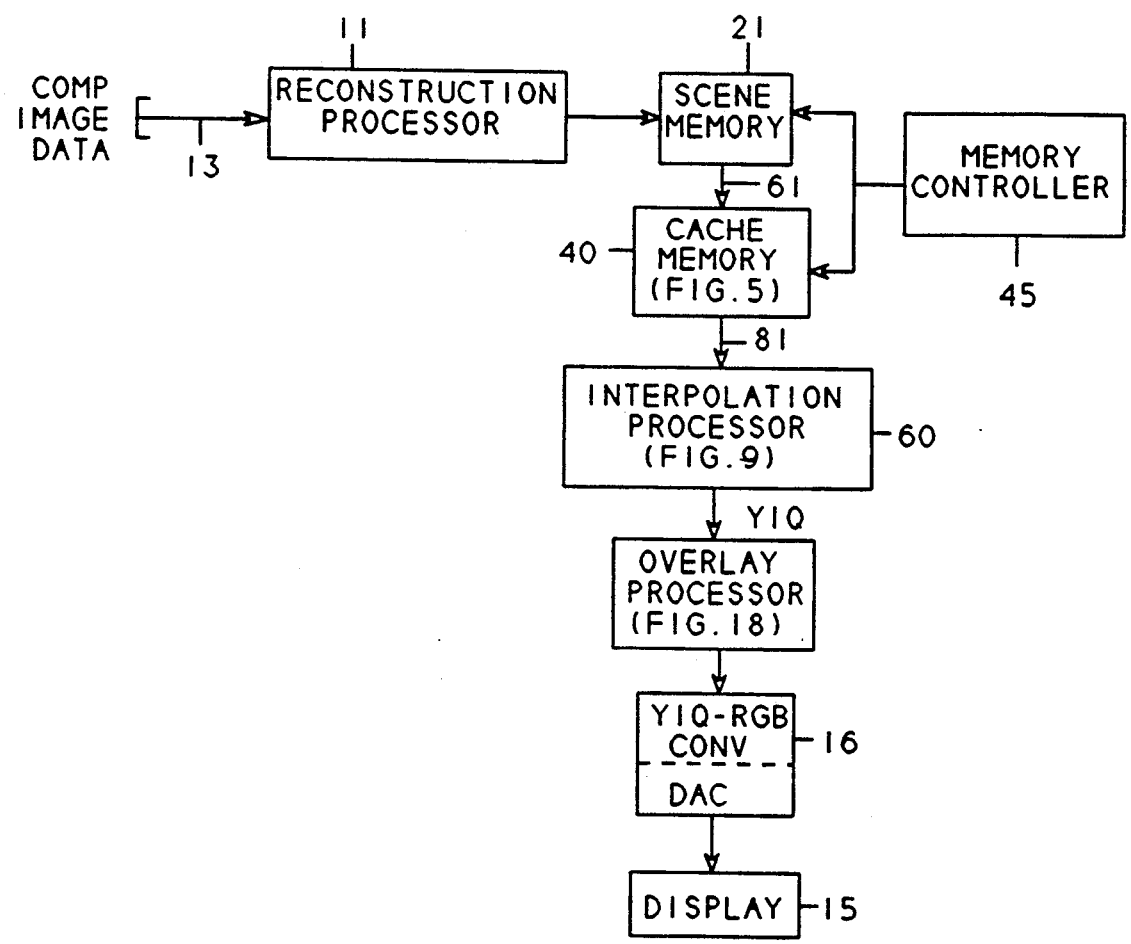
FIG. 1 diagrammatically illustrates the overall functional architecture of a digital map graphics processing system employing the improved interpolation mechanism in accordance with the present invention.

Before describing in detail the particular improved terrain map color imagery interpolation mechanism in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

As pointed out previously, the above-referenced Beckwith et al patent describes a digital map generation and display system which is capable of accessing and displaying a digital terrain map image to an observer (e.g. the pilot of a fixed or rotary wing aircraft) effectively in real time with the travel of the aircraft over that terrain. A principal factor in the ability of the system to so operate is its use of a scene memory, in which data is stored in a prescribed orientation (North-up) and a controlled addressing scheme for reading out contents of the scene memory for display in accordance with heading information signals supplied by on-board navigation equipment. Pursuant to the present invention, the system described in the Beckwith et al patent is substantially enhanced by means of a cache memory and improved interpolation mechanism which both decreases memory size and speed requirements, and yields a color image having reduced artifacts between high contrast areas in the image.

The architecture of a digital map graphics processing system employing the improved interpolation mechanism in accordance with the present invention is diagrammatically illustrated in FIG. 1 as comprising a reconstruction processor 11, which is coupled via an input image data bus 13 to a mass storage device (not shown), from which compressed video data is supplied for display on a downstream color image display device (CRT) 15. The data itself may be one of several types, e.g. scanned raster color imagery data, such as color paper charts and color terrain photographs, symbolic representation of geographic data, typically in the form of a gridded elevational model and an edge-based vector representation of cultural data, and static images (data frames). The manner in which the present invention processes each of these multiple types of imagery data will be explained in detail below. Reconstruction processor 11 is of conventional construction (for example, of the type described in the above-referenced Beckwith et al patent) and produces a decompressed imagery data output for application to scene memory 21 and associated imagery signal processing circuitry. Although the format (full/half resolution) of the decompressed imagery data will depend upon the type of image being processed, the data itself is always stored at a half resolution coordinate coverage, but with full resolution information, in order to reduce memory address requirements.

Figure 2:
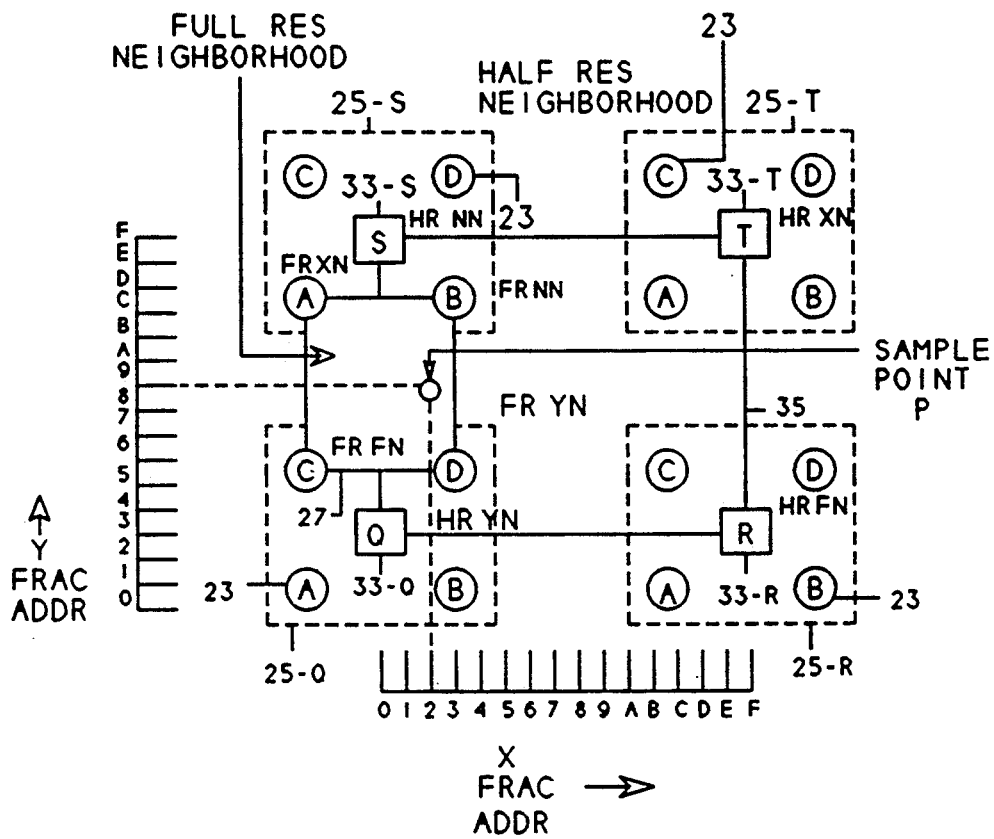
FIG. 2 shows a portion of a scene of image, information within an array of orthogonally dispersed locations of which is contained in the decompressed imagery data output from the reconstruction processor of FIG. 1.

More particularly, FIG. 2 shows a portion of an image (e.g. a raster scanned color map), information at an array or matrix of orthogonally dispersed spatial locations 23 in which, termed full-resolution spatial locations, is contained in half-resolution decompressed data, associated with half-resolution spatial locations 33 of the terrain map, output from reconstruction processor 11, as will be described below. Thus, in the case of a color topographical map which has been optically scanned and digitized, each data value is associated with a respective spatial location 23, having a geographically definable set of coordinates on the grid map. For purposes of the present description it will be assumed that the vertical or Y separation between adjacent spatial locations 23 (or 33) is the same as their horizontal or X separation. (The use A, B, C and D designators associated with spatial locations 23 will be detailed below.) For the example of a topographical map, each of spatial locations 23 may occur at some specified terrain separation interval, with the separation (e.g. North-South (Y) or East-West (X)) between adjacent locations being a prescribed geographical distance, e.g. twenty-five meters.

While it is certainly possible to store imagery data at a dedicated address for each spatial location for each of terrain map locations 23 (i.e. each map location has its own memory address), doing so may require a large memory, depending upon the resolution of the image. Because the resolution requirements for imagery reproduction vary with image type (for example, good quality color reproduction for scanned raster imagery data can be achieved with full resolution luminance data, and only half resolution chrominance data), it has been found that scene memory throughput can be enhanced by storing all data in terms of half-resolution image locations or address space, and then selectively accessing the full resolution data as necessary for a executing a particular image processing operation.

More specifically, the array of image locations 23 may be subdivided into generally rectangularly arranged 'full-resolution' quartets 25 of locations, encircled at A, B, C and D. Diagrammatically shown within the center of each 'full-resolution' quartet 25 is a respective 'half-resolution' location 33, four adjacent ones of which Q, R, S and T define a half-resolution neighborhood 35. For the example of a color terrain map image having twenty-five meter separation between map data locations 23, the distance between adjacent half-resolution locations 33 is fifty meters.

As pointed out above, in accordance with the present invention, imagery data is always stored at a half resolution coordinate coverage, namely corresponding to half-resolution locations 33, but with full resolution information for each half-resolution location. By full-resolution information for each half-resolution location is meant that image information for each of the four locations A, B, C and D of a full-resolution quartet 25 surrounding a respective half-resolution location 33 is stored for that half-resolution spatial location. As a consequence, the number of memory addresses required to implement the scene memory (and an associated cache memory) is reduced considerably (by a factor of four), thereby simplifying hardware requirements and expediting signal processing throughput.

Since the data size will vary depending upon the type of image it represents, the storage capacity of each addressable location must be sufficient to accommodate the data having the largest number of bits. To accommodate any of the above-referenced formats having associated fields as shown in FIG. 3, the depth (or code width) of each storage location in memory may be on the order of forty bits. Taking, as an example, raster scanned imagery color map data, its data field entries contain color information in the form of luminance (Y) and chrominance (in-phase (I) and quadrature (Q)) components resolved to a predetermined number of bits. Since most of the signal energy of scanned imagery color map data is contained in the luminance (Y) component (on the order of 90% or more), associated (five bit) Y values for each of the full-resolution spatial locations A, B, C and D of a quartet 25 surrounding a respective half-resolution location 33 are stored in corresponding portions of a data field identified by the index: Y Color Component. The chrominance components, on the other hand, which contain considerably less information, are stored at only half-resolution, i.e. one I, Q pair for each half-resolution spatial location 33, as shown by the singular chrominance data field: I Color, Q Color, of four and three bits, respectively.

As will be described below, in the course of generation of a pixel energization signal for a respective pixel of display 15, having a spatial location P in FIG. 2, the stored luminance data for each of a full-resolution 'surrounding neighborhood' 27 of spatial locations A, B, C and D associated with one or more full-resolution quartets 25 is interpolated to obtain an output Y value for that pixel, while the stored chrominance data for each location Q, R, S and T of an associated half-resolution surrounding neighborhood 35 is interpolated to obtain output I and Q values for that pixel. It will be noted that full-resolution spatial locations A, B, C and D of full-resolution 'surrounding neighborhood' 27 shown in FIG. 2 are associated with full-resolution data values (and spatial locations) of separate half-resolution spatial locations 33S and 33Q. Namely, full-resolution neighborhood 27 is comprised of spatial locations A and B associated with half-resolution spatial location 33S and spatial locations C and D associated with half-resolution spatial location 33Q. These interpolated Y, I and Q values are then coupled as address inputs to a color conversion look-up table, which generates the requisite R, G and B codes for driving that display pixel.

Symbolic data is stored as its own set of dedicated data fields: Slope Shades, containing two, half-resolution, five bit North and East normals; Elevation data, encoded as seven bits of half-resolution elevation data; Contour lines, comprised of four full-resolution one-bit data; and Cultural data, containing four full-resolution area/linear feature data words. The one bit of contour line data and the four bits of area/linear feature data may be considered five bit full-resolution feature type information. Also shown in FIG. 3 are the data entries for storing a full-resolution thirty-two bit field of a data frame, denoted as Data Frame Index. In a manner similar to that described above with respect to the interpolation processing of scanned imagery data, the contents of the symbology and data frame data fields are selectively processed, to obtain YIQ pixel energization codes which are then converted into RGB signals for energizing a respective pixel of the display.

As pointed out above, signal processing speed is increased in accordance with the present invention by 'localizing' or constraining the computation process to a limited portion of the database, specifically within an image area defined by a subset of spatial locations within the image of interest that contain the spatial location of a respective pixel on the screen of the display device. Namely, for any image being displayed (e.g. on a conventional cathode ray tube display screen), the actual generation of the image is accomplished by the sequential energization of the pixels (picture elements) of the display during alternate interlaced field scanning. Since, however, in a typical in-flight environment, address signals for accessing the contents of the scene memory are produced in accordance with signals representative of heading/attitude information supplied by on-board navigation equipment and represent map locations rather than physical memory locations, such read-out address codes are neither necessarily, nor customarily, associated with the precise address entries of the scene memory. Rather, the pixel addresses are virtual addresses having associated spatial locations on an image surface (e.g. terrain map).

On the other hand, the addresses within the scene memory identify storage locations, rather than physical locations of an image, representative data for which is stored in the memory. Since, as noted above, in an image map processing application, the contents of each memory address are associated with and define attributes of an identifiable spatial location on the (terrain) image, any image location may be considered to be a virtual address for accessing the contents of the scene memory and thereby permit a selective combining of those accessed contents to derive a data code that represents an interpolation of what the image looks like at that location. It can be appreciated, therefore, that each pixel on the display where the stored image is recreated has a corresponding spatial location within the stored image, itself. These corresponding spatial locations are represented by the virtual addresses that are used to access the multi-resolution data stored in scene memory, from which accessed data codes are interpolated into YIQ and subsequently converted RGB signals for energizing the respective pixels of the cockpit display.

Thus, within the image surface represented by the contents of the half-resolution addresses (spatial locations) 33 in FIG. 2, the address generated in correspondence with the energization of a respective screen pixel has an associated spatial location P that falls within or is surrounded by some half-resolution neighborhood 35 of spatial locations (scene memory addresses) Q, R, S and T. As described above, pursuant to the invention, the pixel energization code signal used to drive the pixel whose (virtual) address is associated with spatial location P is interpolated by the controlled weighting and summing of a plurality of actual data values (full and half-resolution) stored within the half-resolution storage locations Q, R, S and T of the half-resolution neighborhood 35 containing 'virtual address' location P. In particular, where half-resolution data is employed, the data is derived from each of the addresses memory locations associated with the neighborhood of a spatial locations Q, R, S and T of half-resolution neighborhood 35; where full-resolution data is employed, the data is derived from that 'full-resolution' neighborhood 27 of spatial locations A, B, C and D most nearly adjacent the spatial location P.

In order to facilitate this process and free up the scene memory for other access operations, an additional 'cache' memory 40 (FIG. 1) is coupled to receive a delimited portion of the scene memory in dependence upon where, within the scene memory, image processing (virtual address scanning) is currently being conducted. As diagrammatically illustrated in FIG. 4, and as will be discussed in detail below, the storage format of scene memory 21 is such that it may be subdivided into an array (e.g. sixteen) of areal blocks 21-1 ... 21-16 of imagery data, within which a region 41 for display may be defined.

For purposes of an illustrative example, within the sixteen block framework of the scene memory and surrounded by a circle 29 is a block 21-11, which contains the current location of a scan line 43 associated with the generation of read-out address codes generated by memory controller 45 (FIG. 1) for accessing data to be displayed. As illustrated in the enlarged depiction in FIG. 4 of the lower region of block 21-11, scan line 43 is associated with the generation of sequential virtual addresses (denoted by Xs along scan 43) associated spatial locations of which pass among spatial locations in the image corresponding to the actual (half-resolution) addresses within the scene memory. The region of scene memory surrounded by an oval 51 contains a sub-array 53 of scene memory addresses (e.g. eight) spatial locations for which immediately surround the spatial location associated with virtual address X in scene memory 21 pointed to by the scanned (pixel) address. As memory controller 45 generates read-out address signals, it updates the scene memory cache 40 with the next associated set of sub-array addresses (e.g. at 30 Hz. or once per update of the display screen), so that irrespective of which spatial location in the image is pointed to by the virtual scan address, cache 40 will provide rapid access to half and full-resolution neighborhood data, and thereby facilitate immediate interpolation processing of the contents of the requisite data fields (via direct accessing of the cache) for energizing the respective pixels of the display.

Figure 5:
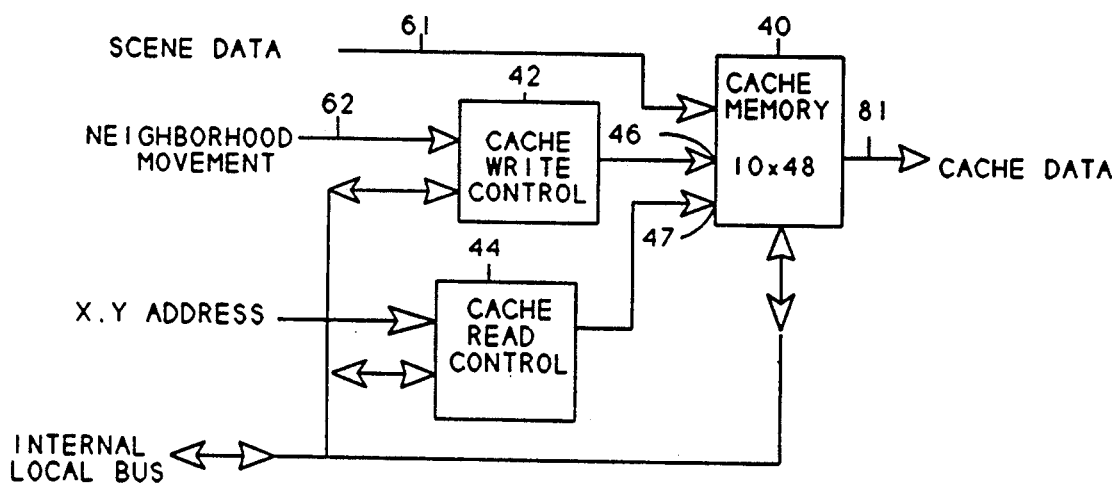
FIG. 5 diagrammatically shows a scene memory cache and its associated write/read control circuits.

The scene memory cache 40 and its associated write/read control circuits 42/44 are shown in FIG. 5. As noted earlier, the scene cache stores data that has been pre-fetched from scene memory 21 and provides a sub-array of scene memory data for interpolating an output data value associated with a scanned pixel address. For the above-referenced example of a maximum data field of forty bits, scene memory cache 40 may be an 10×48 bit memory having independent read and write ports 46, 47 as shown. The write port is used to store data pre-fetched from the scene memory, while the read port outputs data for nearest neighborhood sub-arrays for processing by interpolation processor 60 (FIG. 1).

Data accessed from the scene memory is coupled over link 61 and is controllably written into cache 40 under the control of a write address supplied by cache write control circuit 42. Cache write control circuit effectively translates or converts the scan address output by memory controller 45 into sub-array address codes for writing scene memory data into the cache. Scan signals on line 62 cause a pair of sub-array addresses associated with half-resolution spatial locations 33 (FIG. 2) to be written into the cache. The control logic is configured so that if a write into the cache would over-write data being used to generate these sub-array addresses by the cache read control circuit 44, then pre-fetching of data is interrupted, which allows access to the scene memory for rebuilding the scene.

For each (virtual) X,Y address, cache read control circuit 44 reads out data associated with four half-resolution addresses associated with spatial locations Q, R, S and T of a half-resolution neighborhood 35 containing the spatial location P associated with that scan address. The four half-resolution addresses associated with spatial locations Q, R, S and T are identified as follows. That half-resolution address which is closest to the scan address is referred to as the nearest neighbor (NN). In the example shown in FIG. 2, half-resolution address 33S is the nearest neighbor (NN). Using the nearest neighbor address as a point of reference, the half-resolution addresses that are nearest horizontal (East/West) and nearest vertical (North/South) are referred to as X neighbor (XN), (half-resolution address T in the present example) and Y neighbor (YN), (half-resolution address Q in the present example), respectively. The remaining half-resolution address (R in the present example) is referred to as the farthest neighbor (FN) of half-resolution neighborhood 35.

Figure 4:
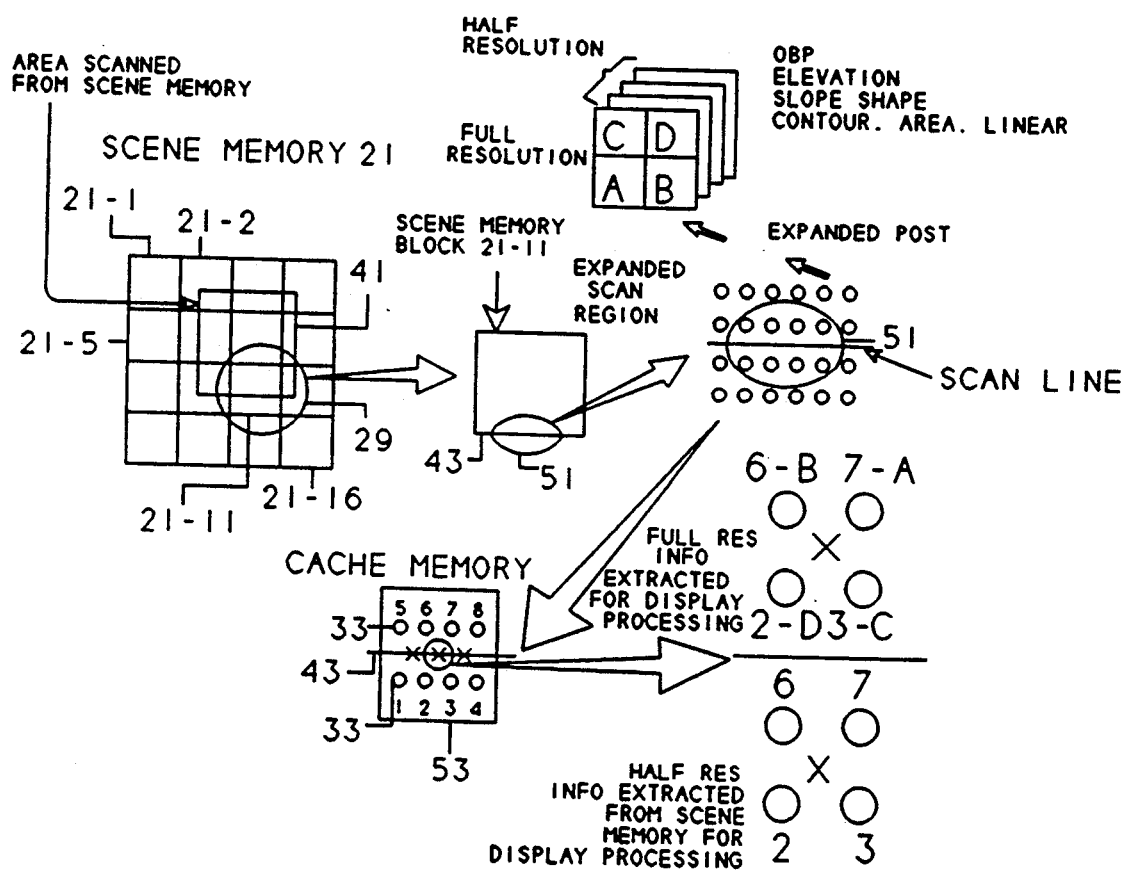
FIG. 4 diagrammatically illustrates the storage format of a scene memory subdivided into an array of areal blocks of imagery data, within which a region to be displayed may be defined.
Figure 8:
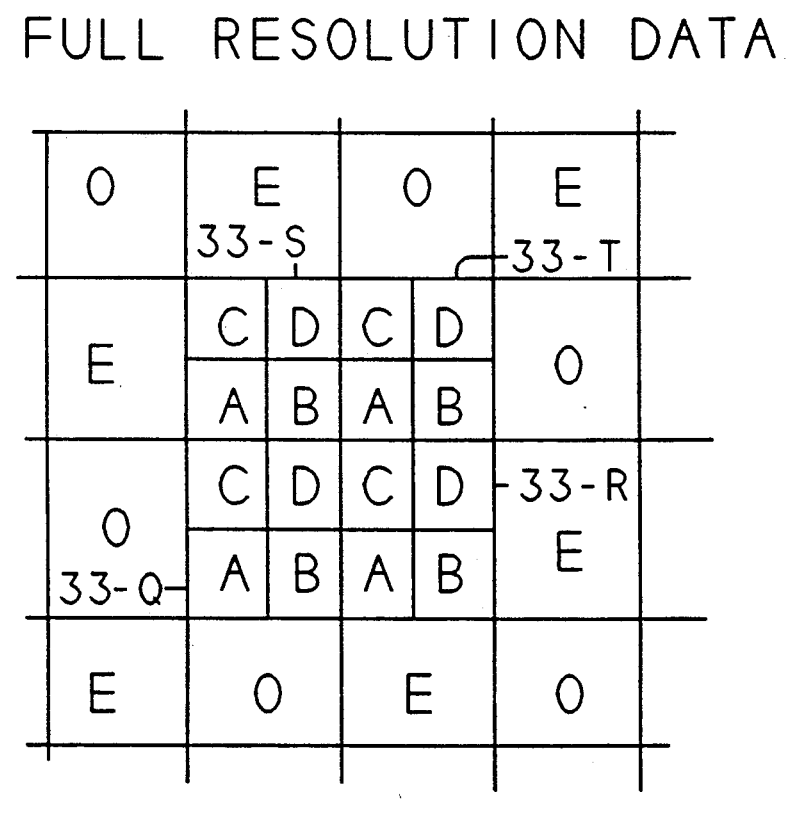

As diagrammatically illustrated in FIG. 4, referenced above, scene memory 21 is subdivided or partitioned into a plurality of (sixteen) memory blocks 21-1 . . . 21-16, an individual one of which 21-i contains a memory capacity of an array of 128×128 half-resolution addresses (each of which is associated with a respective spatial location 33 of FIG. 2), and each having a storage capacity of up to 48 bits, to accommodate the field entries of FIG. 3). Since each half-resolution address stores data for four neighboring full-resolution spatial locations A, B, C and D, each block 21-i within the scene memory effectively stores data associated with an array of 256×256 image locations. The physical blocks are scanned by means of a scene memory directory 70 diagrammatically illustrated in FIG. 6, which maps an 8×8 array of logical block addresses into physical blocks of memory. Scene memory directory 70 wraps around on itself so as to form a continuous map space. Each of scene memory blocks 21-i is organized as an interleaved pair set of odd and even entries of respective odd and even memory banks, as diagrammatically shown in FIG. 7, so that adjacent address locations of a half-resolution neighborhood (e.g. address locations S and T of half-resolution neighborhood 33, shown in FIG. 2) are associated with different memory banks, as diagrammatically shown in FIG. 8.

Figure 9:
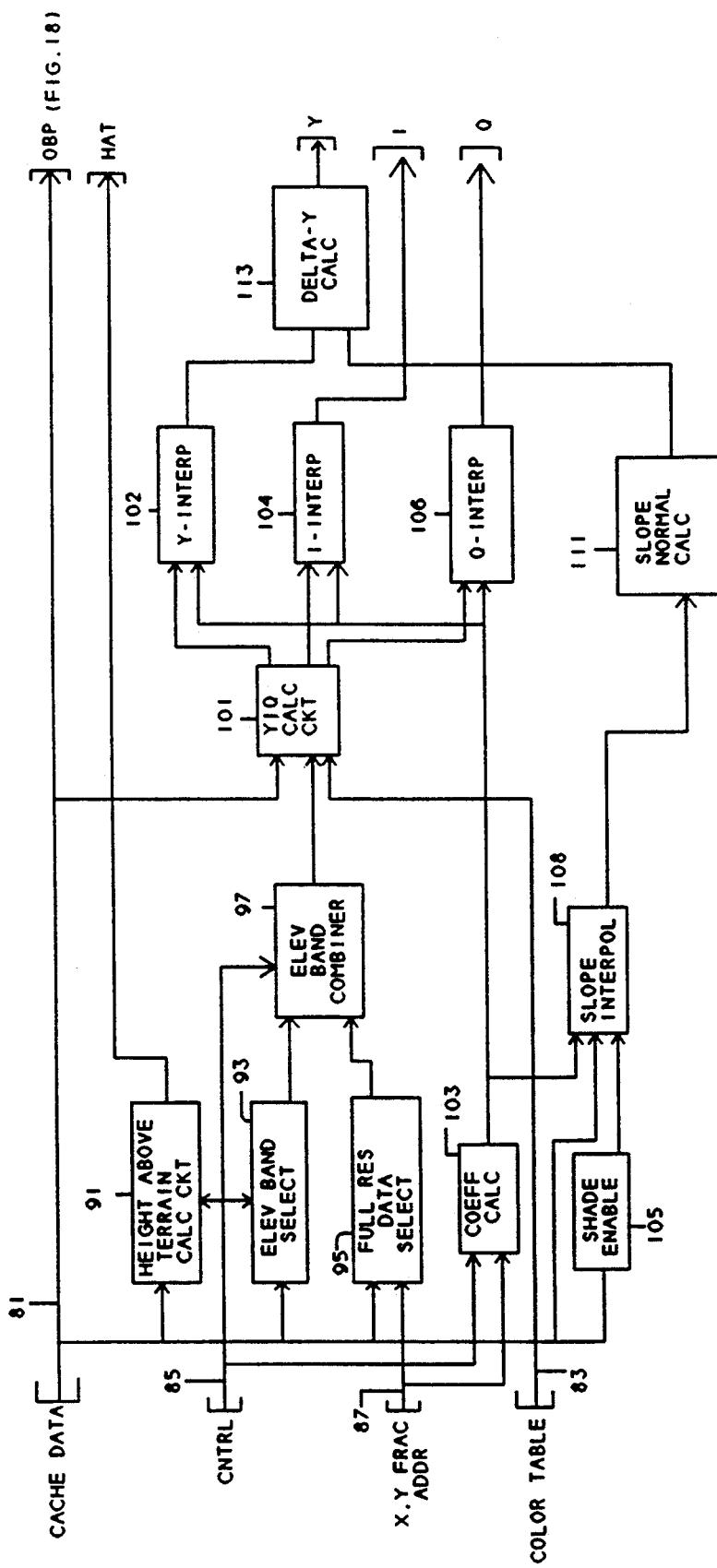
FIG. 9 shows the functional architecture of the interpolation processor of FIG. 1.

Referring now to FIG. 9, the functional architecture of interpolation processor 60 is shown as being coupled to a (forty-eight bits wide) scene cache data link 81 from the output of cache memory 40, a local bus color table interface 83, a control register file data link 85 and an X,Y fractional address link 87 from memory controller 45. Interpolation processor 60 is comprised of a set of arithmetic logic circuits that operate on the half and full resolution data accessed from scene memory cache 40 in the course of an address scan, to produce terrain map YIQ color codes, map overlay information, and interpolated slopes and elevation. As noted previously, which codes are produced will depend upon the type of imagery data being processes (e.g. scanned color map imagery data, symbology data, or data frames).

In the course of in-flight display of raster scanned terrain map imagery data, it is important to warn the pilot of the situation where the height of the terrain being displayed is higher than the actual altitude of the aircraft approaching that terrain. For this purpose, a color overlay or mask operation is performed in order to selectively tint the displayed terrain map to a warning or offset color. This operation is initiated in a height above terrain (HAT) calculation circuit 91 which is coupled to links 81 and 85 and compares a set (e.g. a pair) of reference elevation values (based on aircraft altitude) supplied from memory controller with data representative of the actual elevation of the terrain. For a respective address location, if the elevation of the terrain falls below the largest reference elevation, then the output code produced by HAT calculation circuit 91 (which will be combined with the YIQ codes in downstream processing) is essentially all zeros, so that the eventually produced YIQ code for that address is unaffected by the height of the aircraft. On the other hand, if the input code representative of the elevation of the terrain is above the lowest reference elevation code then, a first color offset (first warning color) code will be output from HAT calculation circuit 91. Similarly, if the elevation of the terrain is above the second reference elevation, a second offset (danger) color code will be output. As will be described below, these offset codes (a code zero representing no, or a transparent, offset) are coupled to a downstream overlay bit plane processing unit for controllably modifying the YIQ outputs of the interpolator.

Elevation band select circuit 93 is coupled with links 81 and 85 to produce sixteen bands of elevation color codes, based upon the four most significant bits of elevation data. These elevation color codes are combined with the full resolution cultural data; as consequence, the half-resolution elevation data is selected by elevation band select circuit 93 so that it matches the associated full resolution neighborhood of the half-resolution address code.

Full resolution data select circuit 95 is coupled to cache output link 81 and fraction address link 87 and selects which full resolution neighborhood locations are associated with the half resolution address location supplied from the scene cache. Thus for the example shown in FIG. 2, where pixel virtual address location P falls between the full resolution neighborhoods 25S, 25Q, respectively associated with half resolution addresses S and Q, full resolution data select circuit 95 selects full resolution data A and B for half resolution address S and full resolution data C and D for half resolution address Q, thus defining a full resolution neighborhood 38 about virtual address location P.

The elevation band code produced by elevation band select circuit 93 and the cultural code generated by full resolution data select circuit 95 are combined in elevation band combiner circuit 97. Up to sixteen elevation bands may be employed; those that are used directly replace that number of the thirty-two cultural codes. The elevation bands which are greater than the number of bands enabled are set to the largest number enabled. The cultural codes may be configured as thirty two features with contour lines included or as fifteen features with one bit used to define contour lines.

The combined elevation code produced by elevation band combiner 97 is coupled, together with cache data link 81 and color table data on link 83, to YIQ calculation circuit 101, which converts cultural codes into their YIQ color components or directly selects YIQ data from the (cached) scene memory data. For symbology imagery data, the conversion from cultural codes to YIQ values may implemented by way of a programmable look-up table. If YIQ data is accessed directly from memory, luminance code remains unaltered, whereas the I and Q components are selected from the appropriate half resolution field.

Coefficient calculation circuit 103 is coupled to links 85 and 87 and outputs interpolation coefficients employed by the bi-linear interpolator circuits 102, 104 and 106, to be described below, based upon X and Y fractional address codes associated with the virtual address for the pixel of interest. For this purpose, coefficient calculation circuit 103 may contain a set of half-resolution coefficient look-up tables, associated with each of half-resolution addresses Q, R, S and T, as respectively shown in FIGS. 10–13, and a set of full-resolution coefficient look-up tables, associated with each of full-resolution addresses A, B, C and D, as respectively shown in FIGS. 14–17. Each coefficient look-up table comprises a two-dimensional array or matrix of coefficient values respectively associated with fractional or incremental X and Y values reference to the half-resolution neighborhood 35 containing the virtual address location P, as shown in FIG. 2. The coefficients of each matrix based upon the following functions:

| neighbor | function | circuit function |
| --- | --- | --- |
| lower left | X*Y | X*Y |
| lower right | (1 − X)*Y | Y − X*Y |
| upper left | X*(1 − Y) | X − X*Y |
| upper right | (1 − X)*(1 − Y) | 1 + X*Y − X − Y |

A slope shade enable circuit 105, which is used to selectively disable slope shading for linear features, contour lines and some area features, is coupled to cache link 81 and detects when a majority of the four full resolution cultural codes for addresses A, B, C and D represent features which are not slope shaded; in this event, the slope shade value for that particular half resolution virtual address (one of Q, R, S and T) is zeroed. Also, should there be a tie between full resolution cultural address values, the slope code is zeroed.

Interpolation of Y, I, Q and slope shade values are executed by respective interpolation calculation circuits 102, 104, 106 and 108, applying full and half resolution neighborhood data to respective bi-linear operations. The interpolation operations are subdivided into half resolution interpolations and full resolution interpolations using the respective sets of coefficients listed in the look-up tables of FIGS. 10–13 and 14–17, referenced above. The interpolation function employed multiplies the four coefficients by the four respective data values and the products are summed together using multiplier-/accumulators implemented in combinational logic.

The interpolated north and east shade codes generated by slope interpolator circuit 108 are coupled to a slope normal calculation circuit 111, which generates a slope shade code. This circuit uses the slope shade components and east and north multipliers in a multiplier-/accumulator to produce a slope shade code based upon the following set of equations:

SLOPE SHADE=$(P*COSI+SINI)/(1-P2-Q2)**.5$ where
P=NORTH SLOPE OF TERRAIN
Q=EAST SLOPE OF TERRAIN
I=SUN AZIMUTH ANGLE
NORTH SLOPE SHADE=$P/(1-P2-Q2)**.5$ (SCENE MEMORY)
EAST SLOPE SHADE=$Q/(1-P2-Q2)**.5$ (SCENE MEMORY)
NORTH MULTIPLIER=SIN I (PRECALCULATED)
EAST MULTIPLIER=COS O (PRECALCULATED)
SLOPE SHADE=NORTH SLOPE SHADE * NORTH MULTIPLIER+EAST SLOPE SHADE * EAST MULTIPLIER.

The outputs of slope normal calculation circuit 111 and luminance interpolation circuit 102 are coupled to a delta Y calculation circuit 113, which sums the slope shade code with the interpolated Y color code and produces a composite Y color code. the degree of slope shading can be modified through the north and east slope shade multipliers.

Figure 18:
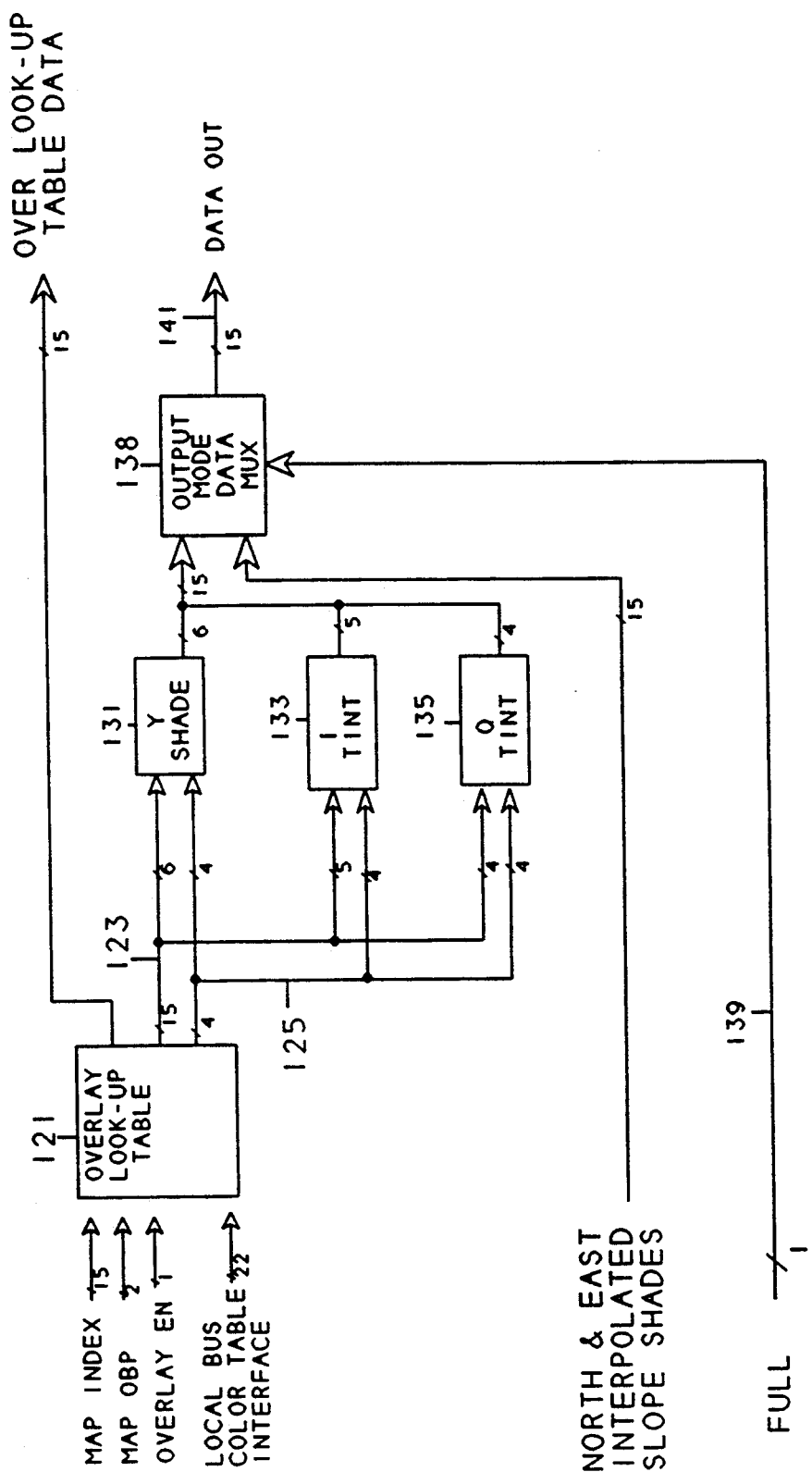
FIG. 18 diagrammatically illustrates an overlay bit processing circuit.
Figure 19:
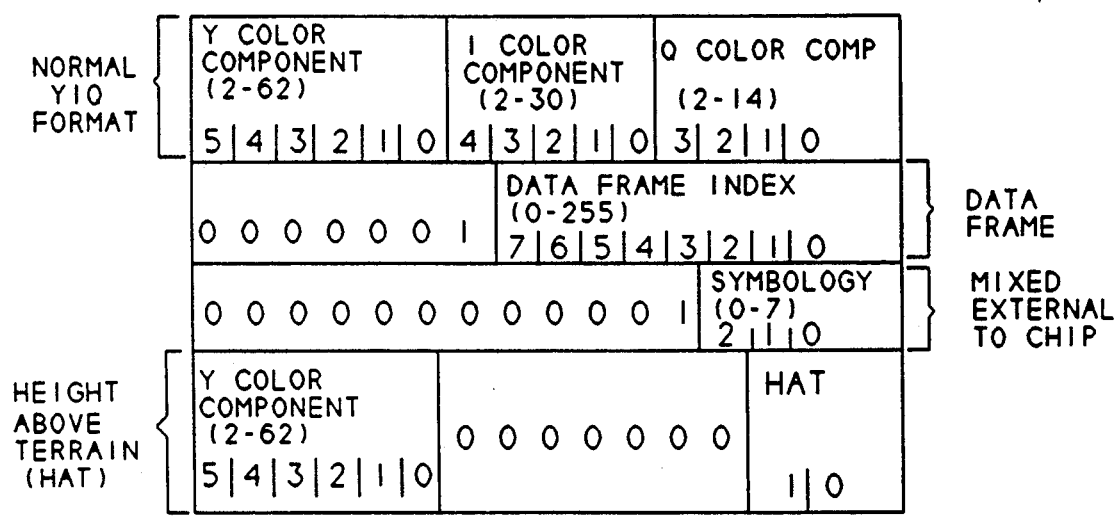
FIG. 19 shows the data fields associated with an overlay bit processor.

In order to show threat zones based on stationary ground installations, an overlay bit plane (OBP) is used. The OBP is loaded as a 'mask' in bits 31 and 32 of the scene memory as half-resolution data, so that a color overlay may be employed to selectively tint the displayed terrain map to a warning or offset color. The selective tinting is executed by an overlay bit processing circuit, diagrammatically illustrated in FIG. 18 and associated data fields for which are shown in FIG. 19, which selectively combines color-modifying (overlay bit plane) data with the interpolated YIQ codes output from delta Y calculation circuit 113, I interpolation circuit 104 and Q interpolation circuit 106 to realize a final YIQ color. Specifically, an overlay look-up table 121 is addressed by the OBP code to produce overlay YIQ and percent of coverage (e.g. 10-100%) codes on links 123 and 125, respectively. These codes are applied to Y, I and Q modifier circuits 131, 133 and 135, respectively, each of which is comprised of multiplier/accumulator circuits, which perform a weighted average of the YIQ data values based upon the percent of coverage codes. The resulting selectively modified YIQ codes are multiplexed onto output link 141, via HAT code replacement logic 138 which replaces I, Q data with HAT designations; IQ values are defined in a YIQ-RGB look-up table.

As will be appreciated from the foregoing description, anomalies in a color image display of a digitized topographical map, as may occur during rotation of the image, are effectively obviated by the imagery data processing mechanism of the present invention, which employs a half-resolution storage compression scheme and an auxiliary scene memory cache through which full resolution data is accessed. Interpolation is carried out by the controlled weighting and summing of plural half and full resolution data values that are stored in (half-resolution) memory addresses whose associated spatial locations neighbor that of the spatial location of interest, thereby generating pixel energization signals for any spatial location on the terrain map.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a video display apparatus having an array of pixels which are controllably energized by video information signals in order to display a video image representative of information stored in memory, a method of generating said video information signals comprising the steps of:
   (a) providing a scene memory having a plurality of memory addresses each of which is operative to store video data to be controllably accessed and processed in the course of generating said video information signals;
   (b) storing, in memory addresses of said scene memory, imagery video data associated with respective spatial locations of an image to be displayed by the pixels of said video display apparatus, said respective spatial locations having a first spatial resolution within said image to be displayed, and wherein a respective first spatial location may, but does not necessarily, coincide with a spatial location of a pixel of said array, and wherein the imagery video data contents of a respective memory address contains a plurality of image video data components, each respective one of which is associated with a respectively different one of a plurality of second spatial locations within said video image to be displayed, said plurality of second spatial locations having a second spatial resolution, which is higher than said first spatial resolution, and wherein any of said plurality of second spatial locations may, but does not necessarily, coincide with the location of a pixel of said array, a respective plurality of second spatial locations being distributed around a respective first spatial location;
   (c) for a respective pixel of said array, identifying where, within said image to be displayed, its associated spatial location occurs;
   (d) accessing video imagery data from a plurality of memory addresses of said scene memory, whose associated respective first spatial locations surround the associated spatial location of said respective pixel; and
   (e) processing the imagery video data accessed in step (d) to produce a respective video information signal through which said respective pixel is energized.

2. A method according to claim 1, wherein step (e) comprises controllably combining video data accessed in step (d) to produce said respective video information signals.

3. A method according to claim 2, wherein step (e) comprises weighting imagery video data access from those memory addresses of said scene memory whose associated respective first spatial locations immediately surround the associated location of said respective pixel and combining the weighted imagery video data to produce said respective video information signals.

4. A method according to claim 1, wherein step (e) comprises weighting imagery video data accessed in step (d) and combining the weighted imagery video data so as to produce respective video information signals.

5. A method according to claim 1, wherein step (d) includes the steps of:
   (d1) providing a cache memory, the speed of access to which is greater than that of said scene memory,
   (d2) storing a prescribed portion of the contents of said scene memory, the associated image for which contains the image location of said respective pixel, in memory addresses of said cache memory, and
   (d3) accessing video imagery data from a plurality of memory addresses of said cache memory whose associated respective spatial locations surround the location of said respective pixel.

6. A method according to claim 5, wherein step (e) comprises controllably combining imagery video data accessed in step (d) to produce a respective video information signal representative of an interpolation of color attributes of said pixel.

7. A method according to claim 5, wherein step (e) comprises performing a bi-linear interpolation of imagery data accessed in step (d) to produce a respective video information signal through which said pixel is energized.

8. A method according to claim 1, wherein step (e) comprises:
   (e1) generating a plurality of matrices of weighting coefficients, each matrix being associated with a respective one of said plural second spatial locations distributed around said respective first spatial location,
   (e2) multiplying imagery video data accessed in step (d) by a weighting coefficient from a respective one said matrices so as to produce a plurality of weighted imagery data, and
   (e3) combining the plurality of weighted imagery video data produced in step (2) to obtain said respective video information signal.

9. A method according to claim 1, wherein imagery video data is representative of luminance and chrominance attributes of said image.

10. A method according to claim 9, wherein step (e) includes the step of controllably modifying imagery video data accessed in step (d) to affect luminance and chrominance attributes associated with a prescribed relationship between said image and an observer of said image.

11. A method according to claim 9, wherein said imagery video data is representative of a terrain map, and step (e) includes the step of controllably modifying imagery video data accessed in step (d) to affect luminance and chrominance attributes associated with a prescribed relationship between said image and the elevation of an observer relative to said terrain.

12. A method according to claim 11, wherein said terrain map contains cultural and contour attributes.

13. A method according to claim 12, wherein said imagery data is representative of slope shading normals for first and second orthogonal directions of said image.

14. A method according to claim 1, wherein said image is a terrain map image and said imagery data is representative of elevation values of the terrain map.

15. A method according to claim 1, wherein said imagery video data is representative of a static data frame.

16. For use with a video display apparatus having an array of pixels which are controllably energized by respective pixel control signals in order to display a video image representative of information stored in a video image database, an arrangement for generating said respective pixel control signals in associated with the scanning of said array of pixels comprising:

a scene memory having a plurality of memory addresses, each of which is operative to store video data to be controllably accessed and processed in the course of generating pixel control signals for energizing the pixels of said display, said scene memory being operative to store, in respective memory addresses thereof, imagery video data associated with respective spatial locations of an image to be displayed by the pixels of said video display apparatus, said respective spatial locations having a first spatial resolution within said image to be displayed, and wherein a respective first spatial location may, but does not necessarily, coincide with a spatial location of a pixel of said array, and wherein the imagery video data contents of a respective memory address contains a plurality of image video data components, each respective one of which is associated with a respectively different one of a plurality of second spatial locations within said video image to be displayed, said plurality of second spatial locations having a second spatial resolution, which is higher than said first spatial resolution, and wherein any of said plurality of second spatial locations may, but does not necessarily, coincide with the location of a pixel of said array, a respective plurality of second spatial locations being distributed around a respective first spatial location;

a memory access control unit which is operative to access video imagery data from a plurality of memory addresses of said scene memory, whose associated respective first spatial locations surround the associated spatial location of a respective pixel of said display; and an interpolation processing unit which is operative to process imagery video data accessed from said scene memory by said memory access control unit to generate a respective pixel control signal through which said respective pixel is energized.

17. An arrangement according to claim 16, wherein said interpolation processor is operative to controllably combine video data accessed from said scene memory to produce a respective pixel control signal.

18. An arrangement according to claim 17, wherein said interpolation processor is operative to weight imagery video data access from those memory addresses of said scene memory whose associated respective first spatial locations immediately surround the associated locations of said respective pixel and combine the weighted imagery video data to produce a respective pixel control signal.

19. An arrangement according to claim 16, wherein said interpolation processor is operative to weight imagery video data accessed from said scene memory and to combine the weighted imagery video data so as to produce a respective pixel control signal.

20. An arrangement according to claim 16, further including a cache memory, the speed of access to which is greater than that of said scene memory, and which is operative to store a prescribed portion of the contents of said scene memory, the associated image for which contains the image location of said respective pixel, and wherein said memory access control unit is operative to access video imagery data from a plurality of memory addresses of said cache memory whose associated respective spatial locations surround the location of said respective pixel.

21. An arrangement according to claim 20, wherein said interpolation processor is operative to controllably combine accessed imagery video data to produce a respective pixel control signal representative of an interpolation of color attributes of said respective pixel.

22. An arrangement according to claim 20, wherein said interpolation processor is operative to perform a bi-linear interpolation of accessed imagery data to produce a respective pixel control signal through which said respective pixel is energized.

23. An arrangement according to claim 16, wherein said interpolation processor is operative to generate a plurality of matrices of weighting coefficients, each matrix being associated with a respective one of said plural second spatial locations distributed around said respective first spatial location, to multiply accessed imagery video data by a weighting coefficient from a respective one said matrices so as to produce a plurality of weighted imagery data, and to combine the plurality of weighted imagery video data to obtain said respective pixel control signal.

24. An arrangement according to claim 16, wherein imagery video data is representative of luminance and chrominance attributes of said image.

25. An arrangement according to claim 24, wherein said interpolation processor is operative to controllably modify accessed imagery video data to affect luminance and chrominance attributes associated with a prescribed relationship between said image and an observer of said image.

26. An arrangement according to claim 24, wherein said imagery video data is representative of a terrain map, and said interpolation processor is operative to controllably modify accessed imagery video data to affect luminance and chrominance attributes associated with a prescribed relationship between said image and the elevation of an observer relative to said terrain.

27. An arrangement according to claim 26, wherein said terrain map contains cultural and contour attributes.

28. An arrangement according to claim 27, wherein said imagery data is representative of slope shading normals for first and second orthogonal directions of said image.

29. An arrangement according to claim 16, wherein said image is a terrain map image and said imagery data is representative of elevation values of the terrain map.

30. An arrangement according to claim 16, wherein said imagery video data is representative of a static data frame.

* * * * *